United States Patent [19]

Koehler et al.

[11] Patent Number: 4,457,388

[45] Date of Patent: Jul. 3, 1984

[54] CHASSIS FOR A VEHICLE WITH VARIABLE UNDERCARRIAGE GEOMETRY

[75] Inventors: Wolfgang Koehler, Karlsruhe; Hans-Joachim Blocher, Metzingen; Eberhard Weiss, Pfullingen, all of Fed. Rep. of Germany

[73] Assignee: Kernforschungszentrum Karlsruhe, Karlsruhe, Fed. Rep. of Germany

[21] Appl. No.: 387,970

[22] Filed: Jun. 14, 1982

[30] Foreign Application Priority Data

Nov. 25, 1981 [DE] Fed. Rep. of Germany ....... 3146662

[51] Int. Cl.³ .............................................. B62D 55/00
[52] U.S. Cl. .................................................. 180/9.48
[58] Field of Search ................. 180/9.46, 9.2 R, 9.48, 180/DIG. 2, 132; 301/128; 74/105, 106

[56] References Cited

U.S. PATENT DOCUMENTS 3,820,616 6/1974 Juergens ............................ 180/9.48

FOREIGN PATENT DOCUMENTS 184451 1/1956 Austria ................................ 180/9.48
111942 9/1978 Japan .................................. 180/132

Primary Examiner—John A. Pekar

[57] ABSTRACT

A chassis for a vehicle with variable undercarriage geometry comprises a cross-frame member extending between and interconnecting undercarriage support beams which are provided with vehicle propulsion means, the cross-frame member including means permitting a change of its length so as to provide for adjustment of the track width of the vehicle.

5 Claims, 5 Drawing Figures

CHASSIS FOR A VEHICLE WITH VARIABLE UNDERCARRIAGE GEOMETRY

BACKGROUND OF THE INVENTION

The present invention relates to a chassis for a vehicle with variable undercarriage geometry which has a number of rollers and/or chain drives supported by support beams pivotally linked to a cross member of a vehicle body. Vehicles of this general type are known. They are used, for example, in buildings with narrow staircases, hallways or other narrow areas which have to be negotiated by a vehicle. The width of such a vehicle must therefore be limited but, since during certain operations the vehicle has to have good stability, the vehicle should be relatively wide.

It would therefore be advantageous if such a vehicle would have a variable undercarriage geometry, that is, if it could have a narrow wheel track if the vehicle has to negotiate narrow passages such as hallways in buildings and a wide track during other operations when a larger width is required for good stability.

SUMMARY OF THE INVENTION

In a chassis for a vehicle with variable undercarriage geometry two elongated undercarriage support beams which are provided with vehicle propulsion means are interconnected by a cross-frame member which includes means for changing its length to permit adjustment of the track width of the vehicle.

Preferably the cross-frame member consists of a guide tube having two slide tube sections axially movably supported therein with the undercarriage support beams being mounted on the ends of the slide tube sections which project from the guide tube and the guide tube is provided with an operating motor operatively connected to the slide tube sections for axially moving the slide tube sections apart from, or toward, each other for changing the vehicle track width.

SHORT DESCRIPTION OF THE DRAWINGS

FIG. 1 is a schematic side view of a vehicle according to the invention which is equipped with a manipulator, FIG. 2 is a top view of the undercarriage of the vehicle of FIG. 1 with manually adjustable wheel track width, FIG. 3 shows in cross-section a cross-beam element interconnecting the undercarriage support beams with motor-operated track width adjustment structure, FIG. 4 is a cross-sectional view along line A-B of FIG. 3, and FIG. 5 shows in cross-section a cross-beam element with an integral operating motor.

DESCRIPTION OF PREFERRED EMBODIMENTS

Figure 1:
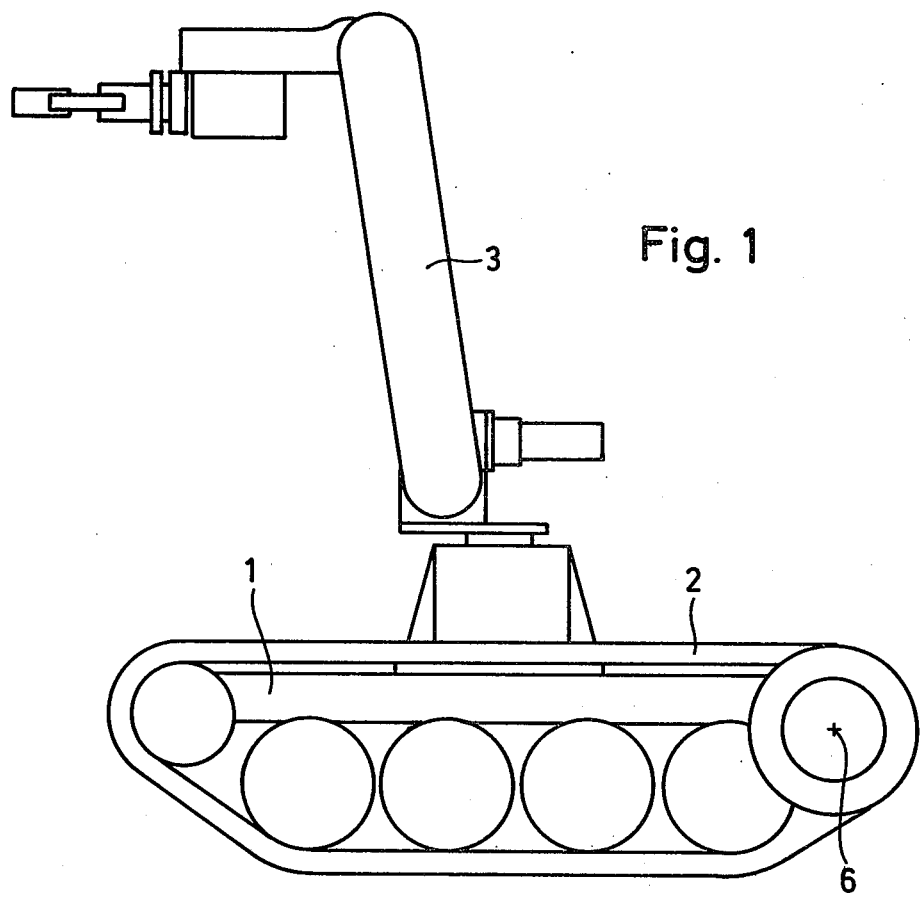

FIG. 1 is a side view of a vehicle with a chassis which has elongated undercarriage support beams 1 provided with chain drives 2 and which carries a manipulator 3 which is not described in detail.

Figure 2:
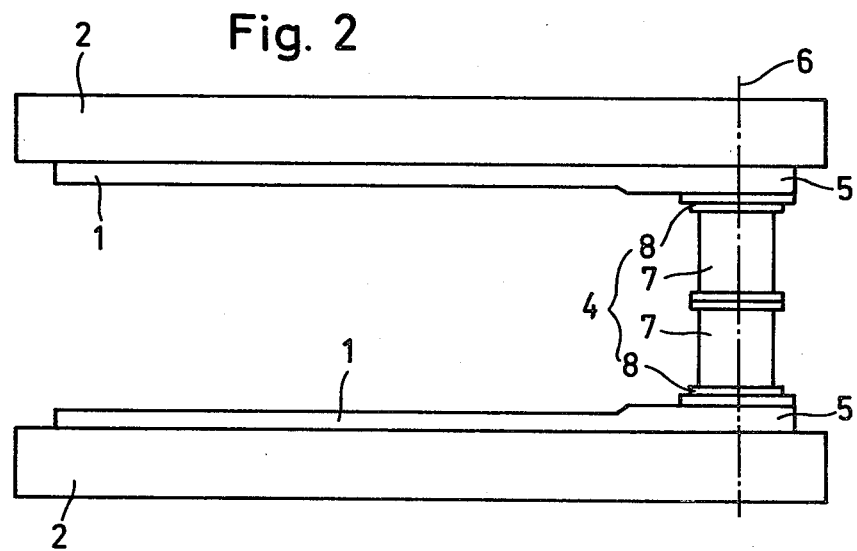

FIG. 2 is a top view of the undercarriage wherein the support beams 1 are shown interconnected by a tubular frame member 4 mounted to the support beams 1 at one of their ends 5, the interconnecting tubular member 4 being part of, and representing, a vehicle body. The tubular member 4 extends coaxial with the pivot axis 6 of the undercarriage support beams 1 which are pivotally supported in a manner not described in detail. In order to permit an increase or a reduction in length of the tubular member for a change of the width of the undercarriage, the tubular member 4 consists of two or more tube sections 7 provided with flanges 8 which are bolted together. For a change of the width of the undercarriage it is then only necessary to remove the flange bolts and manually insert or remove tubular sections. Any vehicle equipment may be mounted directly on the tube sections 7 or it may be supported by a tub-like body which is mounted on the tube sections 7.

Figure 3:
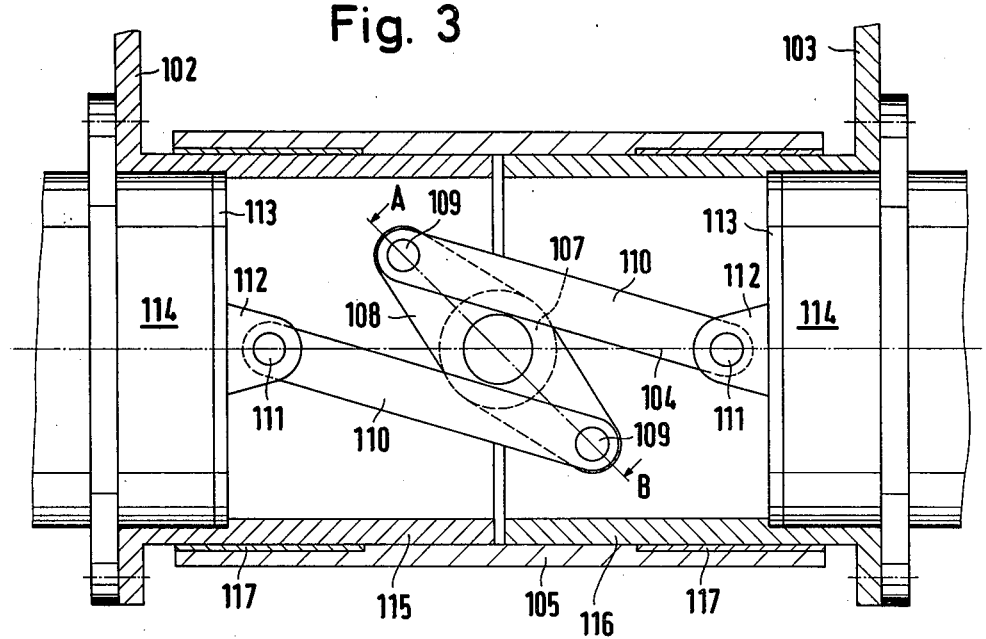
Figure 4:
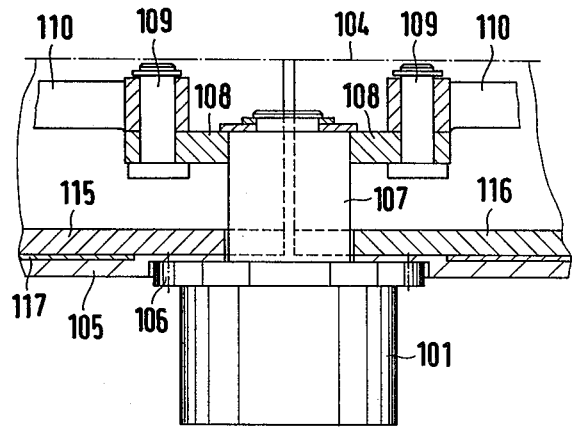

FIGS. 3 and 4 show a motor operated adjustment structure for the undercarriage width wherein the width control motor 101 is arranged outside a tubular guide element 105 which interconnects the frame sections 102 and 103 and not along the side axis 104. The control motor 101 is mounted on the outside of the wall of a guide tube 105 by means of a flange 106. The control motor 101 is geared and has an ouput shaft extending into the guide element 105 and carrying a rotatable collar 107 having opposed arms 108 which are pivotal with the collar 107. Links 110 are linked with one of their ends to the ends of the arms 108 by bolts 109 and with their opposite ends by bolts 111 to lugs 112 of base plates 113 of motors 114 which support and operate the undercarriage support beams 1. They may be supported in a manner described in copending application Ser. No. 387,971, filed June 14, 1982, assigned to the assignee of this application. The motors 114 are firmly mounted on the slide tube sections 115 and 116 which are slidably supported within the guide tube 105 by means of slide bearings 117. The slide tube sections 115 and 116 which carry the motors 114 have the frame sections 102 and 103 associated therewith, which frame sections form the basis for the vehicle frame. It is now seen that these frame sections 102 and 103, by means of the slide tube sections 115 and 116, are supported movably relative to each other such that their distance from each other is adjustable. Adjustment of their distance is achieved by operating the width control motor 101 resulting in rotation of the collar 107 and pivoting of the arms 108 thereby moving, by links 110, the motors 114 with the slide tube sections 115 and 116 apart from, or toward, each other. Such movement takes place along the axis 104 about which the undercarriage may be pivotal in a manner described in the application referenced earlier. The axis 104 corresponds to axis 6 of FIG. 1, however the frame sections 102 and 103 are not visible in FIG. 1 but may be associated with the tube sections 7 as shown in FIG. 1. For the mounting of the equipment, reference is made to what is pointed out with regard to FIG. 1 and also FIG. 5.

Figure 5:
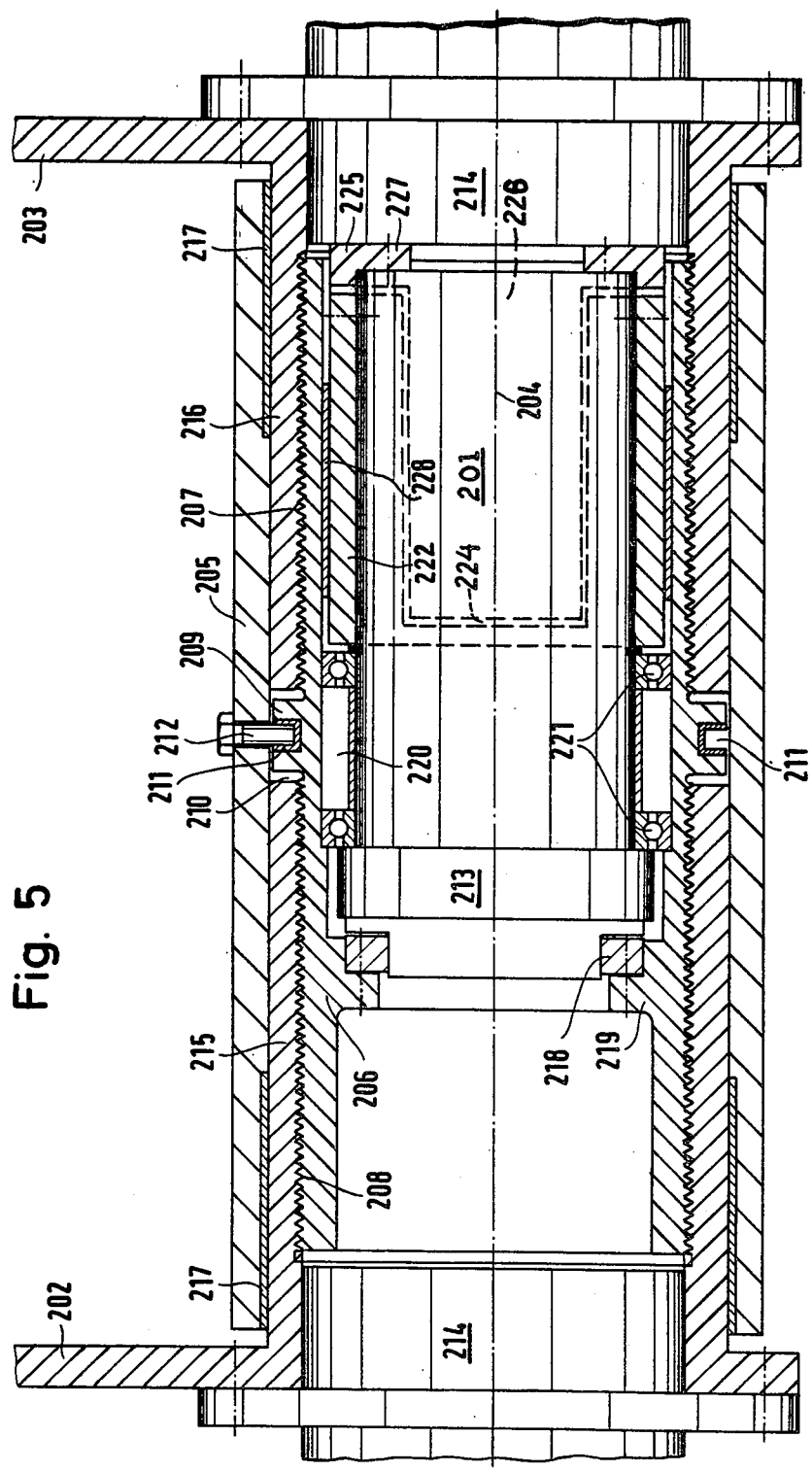

FIG. 5 shows a motorized track width adjustment structure wherein the operating motor 201 is arranged in a space-saving manner coaxial with the pivot or slide axis 204. This arrangement provides for a larger width adjustment range than the one shown in FIGS. 3 and 4. Like in the arrangement of FIGS. 3 and 4, two frame sections 202 and 203 are mounted on slide tube sections 215 and 216 which are slidably supported within a guide tube 205 by slide bearings 217. Motors 214 are mounted into the slide tube sections 215 and 216. The motors 214 may serve as propulsion motors or undercarriage beam pivot motors in a manner described in the application referenced earlier.

For a change of the track width, the frame sections 203 and 202 need to be moved toward, or away from, one another. The main element for such movement is a hollow spindle 206 which is provided with opposite type threads 207 and 208 at its opposite outside ends (at one end a clockwise thread and counterclockwise at the opposite end). The slide tube sections 215 and 216 are correspondingly threaded at their inside and engagingly receive the threads 207 and 208 of the spindle 206. Clockwise and counterclockwise threads 207 and 208 are separated by a collar 209 which forms a stop for the faces 210 of the slide tube sections 215 and 216. The collar 209 is provided with an annular groove 211 which slidingly receives a retaining bolt 212 mounted on the guide tube 205 and projecting into the groove 211. Rotation of the spindle 206 will now cause the slide tube sections 215 and 216 to move apart from each other or closer together; the spindle 206 however remains disposed in the center of the guide tube 205. The guide tube 205 may represent or be part of the vehicle body on which the equipment is mounted. Frame sections 202 and 203 are then not needed; the vehicle frame remains rigid, only the vehicle track width is variable.

Rotation of the spindle is effected by operation of the operating motor 201 which is provided with a coaxial reduction gear unit 213 having an output in the form of a rotatable ring 218. The spindle 206 has an interior shoulder 219 to which the rotatable ring 218 is bolted so that rotation of the operating motor 201 may be transmitted to the spindle 206. The spindle 206 itself is rotatably supported on the housing of the motor 201 by antifriction bearings 221, the motor 201 being disposed fully in the interior 220 of the spindle 206.

In order to anchor the motor 201 such that it may take up the drive torque, a sleeve 222 is mounted onto the motor 201 which sleeve 222 has axial slots 224. The slots 224 are open toward the end 223 of the motor which is remote from the gear unit 213. Received within the slots 224 are axial projections 226 which extend from a retaining member 225, the axial projections 226 having a cross-section corresponding to the cross-section of the slots 224. The retaining member 225 has a flange 227 by which it is mounted on the motor 214 which is connected to the slide tube section 216 and is firmly positioned thereby to prevent its rotation. The motor 214 however remains axially movable relative to the operating motor 201 as the projections are axially movable within the grooves 224. When the motor 201 is operated, the spindle 206 is rotated and moves the slide tube sections 215 and 216 axially relative to each other while the projections 226 move axially within the slots 224 parallel to the surface of the motor 201 and prevent rotation of the motor 201. The sleeve 222 is axially movably supported within the spindle 206 by a bearing structure 228 which is disposed at the interface between the sleeve 222 and the spindle 206 and guides the sleeve 222 during axial movement thereof.

We claim:

1. A chassis for a vehicle with variable undercarriage geometry comprising: elongated undercarriage support beam supporting a vehicle body structure, vehicle propulsion means associated with said undercarriage support beams, a cross-frame member forming part of said vehicle body structure and including one of said undercarriage support beams arranged at each end thereof, a tubular structure comprising a guide tube with two slide tube sections axially movably supported within said guide tube, said slide tube sections projecting from opposite ends of said guide tube and carrying said undercarriage support beams, a hollow spindle extending within said cross-frame member and having end sections threaded at the outside in the opposite sense and engaged with corresponding threads on the inner surface of said slide tube sections and an operating motor disposed within said hollow spindle and operatively connected thereto for rotating said spindle to thereby move said slide tube sections axially away from, or toward, each other for changing the undercarriage track width.

2. A vehicle chassis as claimed in claim 1, wherein said hollow spindle is provided with a collar disposed in the space between said slide tube sections, said collar having a circumferential groove receiving a retaining member associated with said tubular cross-frame member for axially locating said spindle.

3. A vehicle chassis as claimed in claim 1 or 2, wherein said operating motor is disposed within a sleeve connected to the motor and having axial slots receiving projections associated with the adjacent slide tube sections and having a cross-section corresponding to the cross-section of the slots in which they are received, said axially movable slide tube sections being non-rotatably supported within said tubular cross-frame member.

4. A vehicle chassis as claimed in claim 3, wherein said hollow spindle is rotatably mounted on said operating motor by antifriction bearings and an additional bearing structure is disposed at the interface between said spindle and said sleeve and the projections in engagement therewith so as to provide guiding support for said projections within said slots during axial movement of said slide tube sections.

5. A chassis for a vehicle with variable undercarriage geometry comprising: elongated undercarriage support beams supporting a vehicle body structure, vehicle propulsion means associated with said undercarriage support beams, a cross-frame member forming part of said vehicle body structure and comprising a guide tube with two slide tube sections axially movably supported within said guide tube, said slide tube sections projecting from opposite ends of said guide tube and carrying said undercarriage support beams, an an operating motor mounted on the outside of said guide tube with its axis normal to the axis of said guide tube, said operating motor having an output shaft extending into said guide tube and being provided with pivot arms which are linked to said slide tube sections for axially moving said slide tube sections and the associated undercarriage support beams toward, and away from, one another.

* * * * *